Nov. 25, 1930.  W. C. CARR  1,782,866
EXERCISING AND MASSAGING MACHINE
Filed March 13, 1930
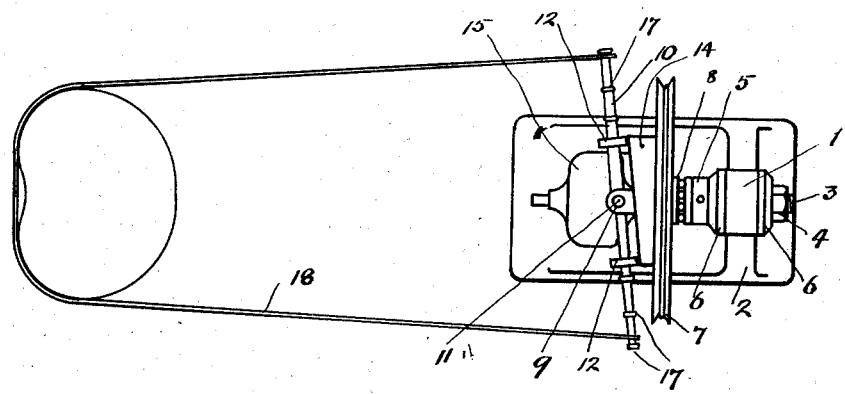
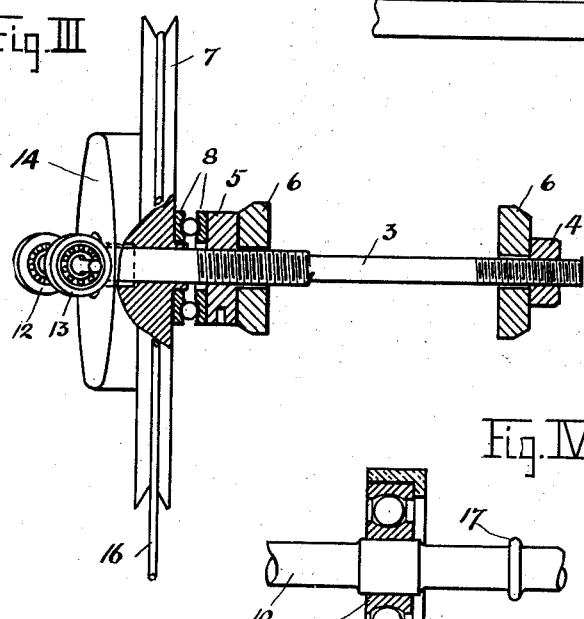
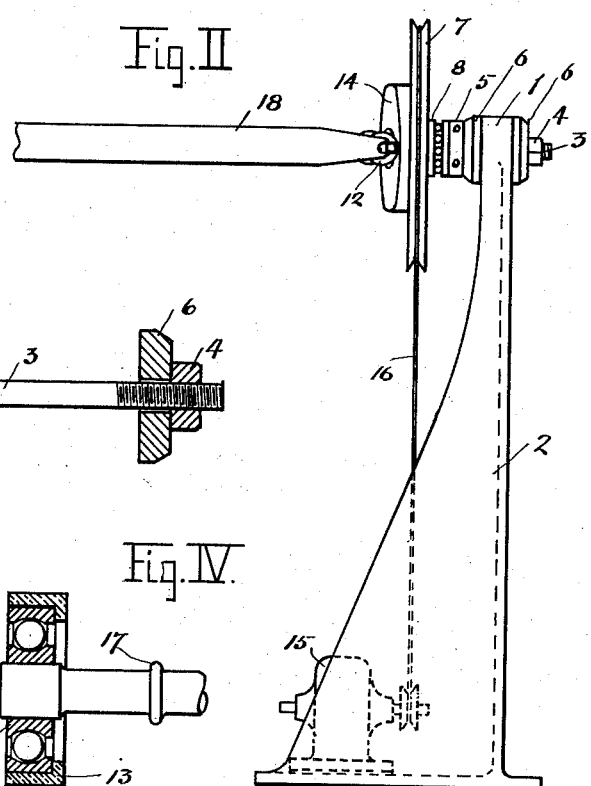
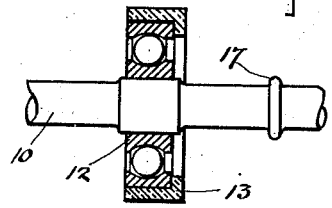
Inventor
William C. Carr.
Arthur Scrivener
Attorney.

Patented Nov. 25, 1930

1,782,866

UNITED STATES PATENT OFFICE

WILLIAM C. CARR, OF RICHMOND, VIRGINIA

EXERCISING AND MASSAGING MACHINE

Application filed March 13, 1930. Serial No. 435,389.

This invention relates to exercising and massaging apparati; and particularly to that type in which there is employed a vibrating strap which may be applied with a rubbing motion or with a vibratory motion, or with a combination of both the vibratory and rubbing motions, to various parts of the human body.

The object of my invention is to provide a machine of the character described, which shall be simple in construction and inexpensive to manufacture. Another object of my invention is to provide a machine which shall be quiet in operation, which shall have few parts, and shall be easy to adjust and to keep in proper operating condition. Another object of my invention is to provide a machine which may be converted to a portable type, so that it may be supported by any convenient post or wall.

Still another object of my invention is to provide a machine whereby vibrating motion may be imparted to the human body either by means of the flexible strap, or directly from the virbrating part of the machine itself.

In the accompanying drawings:—

Fig. I is a plan of my machine;

Fig. II shows the machine in side elevation;

Fig. III is an enlarged view, partly in section, of the head of the machine;

Fig. IV shows a cam roller, in section.

Refering to Fig. I: In the head 1 of the stand 2 is mounted the arbor 3, threaded to engage the nut 4 and the adjusting collar 5. On the arbor 3 are also mounted collars 6, adapted to engage the ends of the head 1 between the nut 4 and the collar 5. A pulley 7 is rotatably mounted on the arbor 3; and on the rearwardly extending hub of the pulley 7 is mounted a ball thrust bearing 8, one face of which bears against the pulley, and the other side against the adjustable collar 5. The forward end of the arbor 3 is developed into a clevis or jaw 9; in the fork of which jaw is mounted the oscillating bar 10, on the pivot 11; the said pivot being substantially midway of the length of the bar 10. Mounted on the bar 10 are rollers 12, 12 consisting of annular ball bearings; on the outer race of which are mounted annular shoes 13 of special material, the function of which shoes is to form a sound absorbing and elastic cushion between the ball bearings 12 and the face-cam 14. This cam is secured to the forward face of the pulley 7. When the pulley 7 is revolved the face-cam 14 revolves with it, and bearing upon the rollers 12 causes the bar 10 to oscillate about the pivot 11 of the jaw 9. Rotary motion is imparted to the pulley 7 by the small electric motor 15, mounted at the foot of stand 2, through the drive cord or belt 16.

The oscillating bar 10 is provided with a number of stops 17, adapted to engage and hold in place the ends of the rubbing strap 18; which ends are provided with eyes which may be slipped over the ends of the bar 10. In the drawing the strap is shown with its ends engaging the opposite ends of the bar 10. It will be seen that the strap may be engaged with one end only of the bar, so as to provide a vibratory effect without rubbing effect. Or the belt may be attached to the two ends of the bar 10, or to even one end of the said bar, but with the two ends of the belt at different distances from the pivot 11 so as to impart to the strap a partly vibratory and a partly rubbing motion.

The exerciser may also obtain from the machine a direct vibratory effect by grasping with his hands the bar 10 itself at a greater or smaller distance from the pivot 11. When the machine is used in this manner the stops 17 on the bar 10 add an additional use in that they prevent the hands from slipping and make the hand hold very secure.

In some machines of this class noisy operation is a great objection. The said noisiness is usually caused by the lack of proper provision for the close adjustment of moving parts. In my machine the noise which in some cases is caused by the rubbing action between the bearing surfaces is largely absorbed by the shoes 13 on the rollers 12; but even with the sound absorbing and elastic shoes, if there was lost motion between them and the face of the cam 14, a noisy vibration would be set up. Any lost motion which may have developed is taken up by the special adjustment provided by the nut 4, adjusting collar 5, and thrust bearing 8. To make the adjustment the nut 4 is slackened; and the collar 5, which engages on a thread on the arbor 3, is rotated to bear with less clearance against the thrust bearing 8, and so draws the cushioned rollers 12 into more exact and intimate contact with the face of the cam 14. This adjustment having been made, the nut 4 is again tightened; so that the forward collar 6 engages against the adjusting collar 5 to prevent its rotatory movement; and so that the two collars 6 again clamp the arbor firmly in the head 1 of the stand 2. When used as a portable machine the arbor 3 is mounted in a post or wall; the said post or wall taking the place of the head 1 of the stand; in which case the electric motor is simply held by screws to the floor.

As it is very necessary, as stated above, to eliminate noisy vibration; in order to do so, and to provide for accurate adjustment of contacting parts, I use a cam 14 having a plane face; that is a face lying all in one plane, not curved; for it would be difficult and expensive to make a curved face cam so accurately that both rollers would always be in contact with the cam face without special spring compensators. Furthermore: I have adopted this particular cam face, and the particular arrangement of rollers on the oscillating bar with respect to the said cam face, because it is the construction which admits of most perfect adjustment. Even should the face of the cam become slightly worn, or the peripheries of the roller shoes 13 become worn, the respective surfaces can be very easily and very inexpensively made true again. In the case of the shoes 13, obviously they can be replaced with ease at any time.

I claim:—

1. An exercising machine comprising a support; an arbor mounted on the support; an oscillating bar pivoted on the arbor; rollers mounted on the bar on either side of the pivot; a cam rotatably mounted on the arbor and adapted to engage the said rollers to oscillate the bar; and means for rotating the cam.

2. An exercising machine comprising a support; an arbor mounted on the support; an oscillating bar pivoted on the arbor; rollers mounted on the bar on either side of the pivot; a cam rotatably mounted on the arbor and adapted to engage the said rollers to oscillate the bar; means for adjusting the contact between the rollers and the cam; and means for rotating the cam.

3. An exercising machine comprising a support; and arbor mounted on the support; an oscillating bar pivoted on the arbor; a flexible strap attached to the oscillating bar; rollers mounted on the bar on either side of the pivot; a cam rotatably mounted on the arbor and adapted to engage the said rollers to oscillate the bar; means for adjusting the contact between the rollers and the cam; and means for rotating the cam.

4. An exercising machine comprising a support; an arbor mounted on the support; an oscillating bar pivoted on the arbor, and having raised portions to act as stops; a flexible strap attached to the oscillating bar; rollers mounted on the bar on either side of the pivot; a cam rotatably mounted on the arbor and adapted to engage the said rollers to oscillate the bar; means for adjusting the contact between the rollers and the cam; and means for rotating the cam.

5. An exercising machine comprising a support; an arbor mounted on the support; an oscillating bar pivoted on the arbor; rollers mounted on the bar on either side of the pivot; annular shoes of non-metallic material mounted on the rollers; a cam rotatably mounted on the arbor and adapted to engage the said rollers to oscillate the bar; means for adjusting the contact between the rollers and the cam; and means for rotating the cam.

6. An exercising machine comprising a support; an arbor mounted on the support; an oscillating bar pivoted on the arbor; rollers mounted on the bar on either side of the pivot; annular shoes of softer material than the rollers mounted on the said rollers; a cam rotatably mounted on the arbor and adapted to engage the said rollers to oscillate the bar; means for adjusting the contact between the rollers and the cam; and means for rotating the cam.

7. An exercising machine comprising a support; an arbor mounted on the support; an oscillating bar pivoted on the arbor; rollers mounted on the bar on either side of the pivot; a cam rotatably mounted on the arbor and adapted to engage the said rollers to oscillate the bar; a thrust bearing between the cam and the support; an adjustable collar mounted on the arbor and adapted to adjust the contact between the rollers and the cam; and means for rotating the cam.

8. An exercising machine comprising a support; an arbor mounted on the support; an oscillating bar pivoted on the arbor; rollers mounted on the bar on either side of the pivot; a cam rotatably mounted on the arbor and adapted to engage the said rollers to oscillate the bar; an adjustable collar mounted on the arbor and adapted to adjust the contact between the rollers and the cam; and means for rotating the cam.

9. An exercising machine comprising a support; an arbor mounted on the support; an oscillating bar pivoted on the arbor; rollers mounted on the bar on either side of the pivot; a cam rotatably mounted on the arbor and adapted to engage the said rollers to oscillate the bar; a thrust bearing between the cam and the support; an adjustable collar mounted on the arbor and adapted to adjust the contact between the rollers and the cam; adjustable means for locking the said collar; and adjustable means for clamping the arbor in the support.

10. An exercising machine comprising a support; an arbor mounted on the support; an oscillating bar pivoted on the arbor, and having raised portions to act as stops; a flexible strap attached to the oscillating bar; rollers mounted on the bar on either side of the pivot; annular shoes of softer material than the rollers mounted on the said rollers; a cam rotatably mounted on the arbor and adapted to engage the said rollers to oscillate the bar; and means for rotating the cam.

11. An exercising machine comprising a support; an arbor mounted on the support; an oscillating bar pivoted on the arbor; a flexible strap attached to the oscillating bar; rollers mounted on the bar on either side of the pivot; a cam rotatably mounted on the arbor and adapted to engage the said rollers to oscillate the bar; means for adjusting the contact between the rollers and the cam; and means for rotating the cam.

12. An exercising machine comprising a support; an arbor mounted on the support; an oscillating bar pivoted on the arbor, and having raised portions to act as stops; rollers mounted on the bar on either side of the pivot; annular shoes of softer material than the rollers mounted on the said rollers; a cam rotatably mounted on the arbor and adapted to engage the said rollers to oscillate the bar; means for rotating the cam; a thrust bearing between the cam and the support; an adjustable collar mounted on the arbor and adapted to adjust the contact between the rollers and the cam; adjustable means for locking the said collar; and adjustable means for clamping the arbor in the support.

In testimony whereof I have hereunto affixed my signature.

WILLIAM C. CARR.